United States Patent [19]
Wilding et al.

[11] Patent Number: 5,730,879
[45] Date of Patent: Mar. 24, 1998

[54] PROCESS FOR CONDITIONING RECIRCULATED EVAPORATIVE COOLING WATER

[75] Inventors: Charles P. Wilding, Seal Beach; Berile B. Stander, Woodland Hills; Frank J. Baumann, Pasadena, all of Calif.

[73] Assignee: World Laboratories, Ltd., Sun Valley, Calif.

[21] Appl. No.: 674,550

[22] Filed: Jul. 1, 1996

[51] Int. Cl.$^6$ ............................................. C02F 9/00
[52] U.S. Cl. ........................ 210/662; 210/668; 210/743; 210/765
[58] Field of Search ........................ 210/662, 663, 210/668, 685, 739, 743, 746, 758, 760, 765, 96.1, 805

[56] References Cited

U.S. PATENT DOCUMENTS 4,532,045  7/1985  Littman .................................. 210/685
4,931,187  6/1990  Derham et al. ......................... 210/96.1
5,145,585  9/1992  Coke ....................................... 210/760

*Primary Examiner*—Ivars Cintins
*Attorney, Agent, or Firm*—Edgar W. Averill, Jr.

[57] ABSTRACT

A process for conditioning recirculated evaporative cooling water in a cooling water system. The process reduces the amount of make-up water required during the operation of this system as compared to conventional water treatment systems. The process includes the steps of determining the pH of saturation. A strong cation exchange media is used in a controlled sidestream and operated so that the pH of the recirculated cooling water is within about a plus or minus 0.4 of the pH of saturation. The system avoids the necessity of storing acid at the water treatment site and also significantly reduces the amount of make-up water required.

2 Claims, 1 Drawing Sheet

PROCESS FOR CONDITIONING RECIRCULATED EVAPORATIVE COOLING WATER

BACKGROUND OF THE INVENTION

The field of the invention is water treatment and the invention relates more particularly to the treatment of water used in evaporative recirculating cooling systems.

Several methods are widely used to chemically treat cooling waters. One such process is the all polymer treatment program which relies totally on the use of polymers for both scale and corrosion control. The pH of the system's cooling water is allowed to reach values as high as 8.5–8.8. The system is simple in that it may be controlled by adding a single product directly from a container to the cooling water, and the system is capable of maintaining a reasonable amount of control over scale and corrosion. However, in order to properly control the system, an increasing volume of water must be bled from the system to keep dissolved salts within their ranges of solubility, thus preventing scale formation. This requires large additions of make-up water to keep the concentration cycles within a scale free range. Also, this treatment scheme is relatively high in cost and is quite inadequate in controlling microbiological fouling of exchange surfaces.

A second commonly used system is one in which the pH and alkalinity of the cooling water are controlled through the addition of potentially hazardous chemicals. This type of system has the advantage of permitting somewhat higher concentrations of dissolved salts to build up in the cooling water, thus, allowing greater "cycles of concentration". This results in considerable savings of water as less make-up water is required as compared to the polymer treatment program. The potentially hazardous chemical additions are capable of scale and corrosion prevention as well as keeping microbiological growth in control. This maintains cleaner and more efficient heat transfer surfaces. While the overall treatment cost is somewhat less than in the all polymer system, this process relies on chemical additions, the main of which is fairly concentrated, thus potentially hazardous, sulfuric acid. Safety and environmental concerns tend to make this type of treatment process less attractive and increasingly more expensive.

Evaporative cooling systems, of which cooling towers are one example, operate on the principle that the latent heat of vaporization of the water being evaporated subtracts energy from the system, thus, reducing the temperature of the remaining water in the system. Only some of the water is evaporated, however, and the salts in the remaining water are manifested in increasing dissolved solids. The most common dissolved salts in domestic water are bicarbonates, chlorides, and sulfates of calcium, magnesium and sodium. When a water containing calcium bicarbonate is heated, as in cooling of air conditioning systems or other equipment, the heat will strip off one molecule of carbon dioxide, rendering the remaining calcium salt to calcium carbonate (limestone), according to the equation:

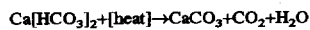

$$Ca[HCO_3]_2 + [heat] \rightarrow CaCO_3 + CO_2 + H_2O$$

Unlike most salts, calcium carbonate is less soluble in hot water than in cold water. This is why boiler scales (calcium carbonate scales) are deposited on hot heat exchange surfaces. Calcium carbonate solubility is also a function of the pH of a water. Calcium salts are markedly less soluble in high pH systems. Knowing these properties of dissolved solids in cooling waters thus offers several means of control.

Controlling the pH will allow more calcium to remain in solution, thus preventing it from becoming a hard scale on heat exchange surfaces or, perhaps better still, if one were to eliminate calcium and magnesium from the system entirely, or at least drastically reduce them, the same control could be exercised. This has in fact been done through the provision of a water softener to soften (i.e., remove the hardness-causing ions, calcium and magnesium) the cooling water. While this effectively controls scale, it does not necessarily eliminate the need for acid feed to control pH. This would also require extremely large equipment to soften the water and is thus impractical. Furthermore, softened waters are notoriously much more corrosive than unsoftened ones. Thus, in these systems, the scaling problem have may have been eliminated, but at the expense of increased corrosion.

Several patents discuss various approaches to treating make-up water, including U.S. Pat. Nos. 2,807,582, 3,805,880 and 4,532,045. The '045 patent discusses numerous different methods of treating cooling water with a minimal differentiation of advantages and disadvantages of the various approaches. U.S. Pat. No. 5,145,585 utilizes ozone treatment followed by filtration and centrifugation.

In order to be practical on a wide scale, a water treatment system must be simple and capable of use by plant personnel.

BRIEF SUMMARY OF THE INVENTION

It is an object of the present invention to provide a cooling water treatment process capable of maintaining absolute scale and corrosion free heat transfer surfaces and of resulting in a drastic reduction in water consumption, all without the need for on-site use of acids.

The present invention is for a process for conditioning recirculating evaporative cooling water in a cooling water system [as in a cooling tower], including a source of make-up water to replenish water lost to evaporation. The process includes a vessel containing a strong cation exchange resin operating on the hydrogen cycle. A portion (a sidestream) of the recirculating water is piped through the vessel containing the strong cation exchange resin wherein positively charged dissolved ions, such as calcium ($Ca^{++}$), Magnesium ($Mg^{++}$) and sodium ($Na^+$) are exchanged for their hydrogen ion ($H^+$) equivalent, thus constantly removing hardness-causing and other ions from the water, allowing for a much greater and more efficient use of the cooling water. A more efficient use of cooling water results from the fact that solids are prevented from building up, thus requiring very little bleedoff of water to keep solids within acceptable ranges. Only a sidestream of the cooling water is directed through the resin vessel. The portion of the water so treated is determined by the pH of saturation ($pH_s$) of the water.

DESCRIPTION OF THE PREFERRED EMBODIMENTS

Figure 1:
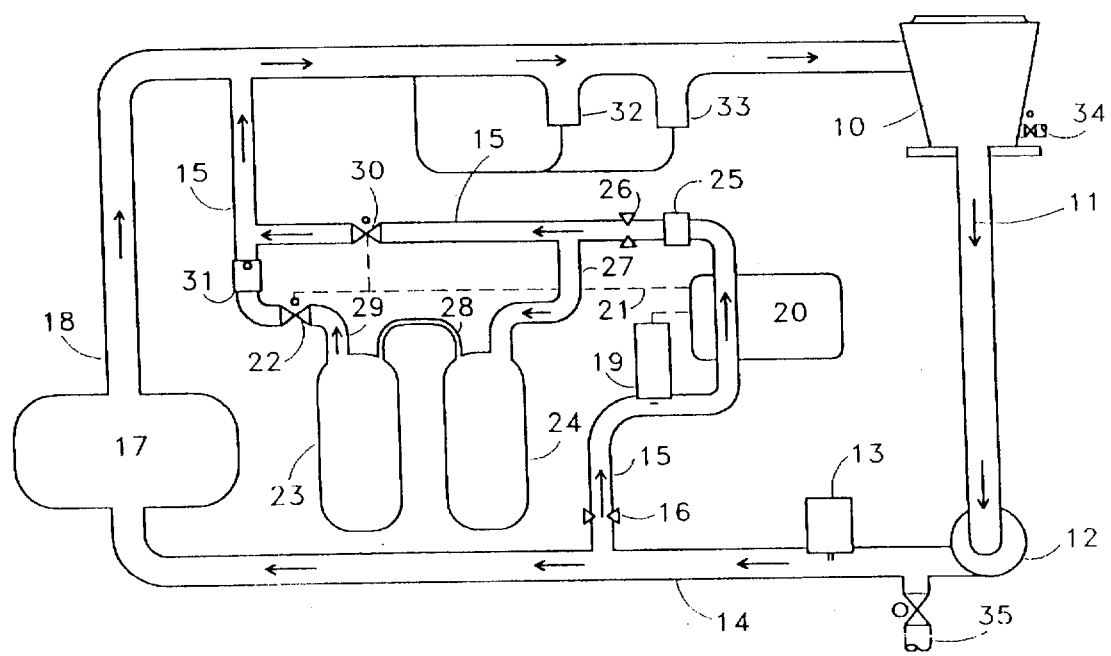
FIG. 1 is a diagrammatic view of the process for conditioning recirculating evaporative cooling water of the present invention.

The heart of the present invention is the control of the pH of the recirculating water at or very close to the pH of saturation ($pH_s$) of the recirculating water at or very close to the previously determined pH of saturation. This is accomplished by subjecting a side stream of the recirculating water to a cation ($H^+$ cycle) exchange, thus controlling not only its pH but also its dissolved solids. pH of saturation is defined as "The pH at which, without change in total alkalinity and calcium content, a water would be in equilibrium with solid calcium carbonate." The calculation of the pH of saturation requires knowledge of four variables: Total alkalinity, calcium hardness, total dissolved solids, and temperature. The scaling or nonscaling characteristics of a water can be determined by the equation:

$$pH_s = pCa + pAlk + C$$

where pH$_s$ is the pH of saturation;

pCa is the log factor of the calcium hardness, expressed in mg/L CaCO$_3$;

pAlk is the log factor of the alkalinity expressed in mg/LCaCO$_3$; and

C is the log factor of the total dissolved solids at the temperature of the water.

The saturation index "I$_s$" is the algebraic difference between the actual system pH and the calculated pH of saturation, i.e., $$I_s = pH \text{ (actual)} - pH_s \text{(calculated)}.$$

There are several means of calculating pH$_s$ and saturation indices. Every handbook of water has at least one nomograph for its calculation. Caldwell-Lawrence diagrams allow for the graphical solution of the necessary equations, and there are several relatively simple computer programs written for the convenient calculation of not only these, but additional corrosion indices.

The present invention relies on the accurate determination of the saturation index (I$_s$), then, by using pH controllers, tuning the throughput of water through the cation exchange system to the point where the index is kept within very narrow limits, such as plus or minus 0.4 of that index, based on the knowledge that:

When I$_s$ is zero, i.e., when pH equals pH$_s$, a saturation equilibrium exists and there is no scale formation, and corrosive attack is minimized.

When I$_s$ is positive, i.e., when pH is greater than pH$_s$, a condition of supersaturation of calcium carbonate exists with respect to the alkalinity and total solids content at existing temperature conditions, tending to deposit scale on heat transfer surfaces.

When I$_s$ is negative, i.e., when the pH is greater than the pH$_s$, the equilibrium is unbalanced in the opposite direction, and corrosion of bare metal will occur, and any scale previously formed will be dissolved.

A system utilizing the process of the present invention has been in experimental use and has proven itself capable of maintaining 15 cycles of recirculating water (over values of the water as received, and compared to a present state of the art industry standard average of 3 cycles of concentration). Heat exchanger surfaces using water so treated showed no evidence of corrosion or scale buildup. The surfaces were clean, requiring neither brushing nor chemical cleaning. Use of the treatment process described in the invention resulted in a net saving of water from a single cooling tower of 1,186,000 gallons per year. This saving is the result of the increased cycles of concentration the tower can undergo. Were the tower to have been operated conventionally, bleedoff water would have amounted to 1,384,000 gallons. By using the system described herein, only 198,000 gallons of water needed to be bled off to waste. This substantial water saving was achieved while maintaining the pH of saturation within a closely controlled range in which neither corrosion nor scale buildup occurs.

The present invention is illustrated in FIG. 1 where a cooling tower 10 has a controlled inlet of make-up water 34 and an outlet of cooling water flowing in the direction of line 11. The water flows through pump 12 and out of pump 12 into line 14. A controlled bleedoff line 35 is used to remove water to the drain. A Corrater probe 13 provides a measure of corrosion rates. A sidestream permits some of the water from line 14 to flow through line 15. Water flowing through line 15 passes a pH electrode 19 which in turn passes a signal to pH controller 20. This controls the position of control valves 22 and 30 which determines the flow through the sidestream in line 15. The water continuing through line 14 flows through heat exchanger 17 where it is heated, and the heated water passes out of heat exchanger 17 into line 18. The sidestream passing through line 15 then joins line 18 where corrosion chemicals 32 and biocides 33 may be added to the recirculated stream as needed. The heated water from line 18 then returns to cooling tower 10.

Returning now to sidestream 15, the water after leaving line 14 passes one of two isolation valves 16 and 26 which may be closed to isolate the pH controller and pH electrode for servicing. After leaving the pH controller, the water passes flow switch 25 and then may either continue in line 15 to be returned to line 18 or may be diverted through line 27 to pass into a first cation exchange unit 24 and from there through line 28 into a second cation exchange unit 28. The cation exchange units, as explained above, exchange calcium, magnesium and sodium ions for their hydrogen ion equivalents, thus constantly removing hardness-causing and other ions from the water. Furthermore, the pH is lowered and controlled without the use of on-site acid. This provides a substantial improvement in ease of operation as well as improved safety. The line 29 passing out of cation exchanger 23 passes through control valve 22 which is operated by pH controller 20. A flow indicator 31 measures the rate of flow through the cation exchange units. Water which does not pass through the cation exchange units from line 15 passes through control valve 30 which is also controlled by pH controller 20. Thus, the system can be automatically maintained in the desired pH range which is within a close range of the pH of saturation. That is, within a plus or minus 0.4 pH of the previously determined pH of saturation and preferably within a smaller range of plus or minus 0.16.

The process of the present invention utilizes four known chemical and engineering technologies designed to function as one integrated process. This process will condition recirculated cooling water to essentially prevent scale, corrosion, and micro-organisms on either the heat exchange surfaces or the cooling tower's inner structure. The cation exchange cylinder 23 and/or 24 exchange hydrogen ions for cations such as calcium, magnesium and sodium. As the water circulates through the main loop including lines 14 and 18 it is constantly being monitored by a pH controller 20. The pH controller 20 activates a second side stream flow beginning in line 27 which passes through exchanger 24 and/or 23. This results in the control of the pH to within a close range of the previously determined pH of saturation. A second monitor 32 is monitoring the corrosion potential and directs the feed rate for corrosion inhibitor injections. A third monitor 33 is monitoring the oxidizing chemical levels. This monitor activates a generator producing a controlled level of oxidizing agents controlling the micro-organism growth. The result is a saving in water, a saving in energy and a saving in chemicals and a system free of scale, corrosion and micro-biological contamination.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

We claim:

1. A process for conditioning recirculating evaporative cooling water in a cooling system of the type including a source of make-up water, an evaporative cooling unit and a heat exchanger piped together in a circulating line and including a makeup water line, and a bleedoff line, said process being useful to reduce the amount of make-up water required during the operation of the system and to prevent essentially scale, corrosion and micro-biological contamination, said process comprising:

determining the pH of saturation of the recirculated evaporative cooling water in the cooling water system;

passing a controlled volume of the recirculated evaporative cooling water through a strong cation exchange media positioned in a side stream from said circulating line in an amount sufficient to maintain the pH of the recirculated evaporative cooling water within a positive 0.4 above and a negative 0.4 below the pH of saturation;

monitoring the corrosion potential to provide a measurement which determines an amount of corrosion inhibitor to be added;

adding a corrosion inhibiter to the cooling water in response to the measurement obtained by monitoring the corrosion potential of this cooling water;

monitoring the oxidizing chemical levels in the circulating line to provide a measurement which determines the activation of a generator to produce a controlled level of oxidizing agents; and generating oxidizing agents in the cooling water in response to the measurement obtained by monitoring the oxidizing chemical levels of the cooling water in the circulating line.

2. The process of claim 1 wherein said pH is maintained within a range of no more than 0.16 and no less than a negative 0.16 of the pH of saturation.

* * * * *

UNITED STATES PATENT AND TRADEMARK OFFICE
CERTIFICATE OF CORRECTION

PATENT NO.   : 5,730,879
DATED        : March 24, 1998
INVENTOR(S)  : Stander et al It is certified that error appears in the above-identified patent and that said Letters Patent is hereby corrected as shown below:

On the title page, change the order of the inventors as follows:

Berile B. Stander, Charles P. Wilding and Frank J. Baumann.

```
Item [19] "Wilding et al" should read --Stander et al--
```

Signed and Sealed this

Seventeenth Day of November, 1998

Attest:

BRUCE LEHMAN

*Attesting Officer*   *Commissioner of Patents and Trademarks*